April 25, 1961 C. A. RUTIGLIANO 2,981,552
THIRD WHEEL DEVICE
Filed March 4, 1960 2 Sheets-Sheet 1
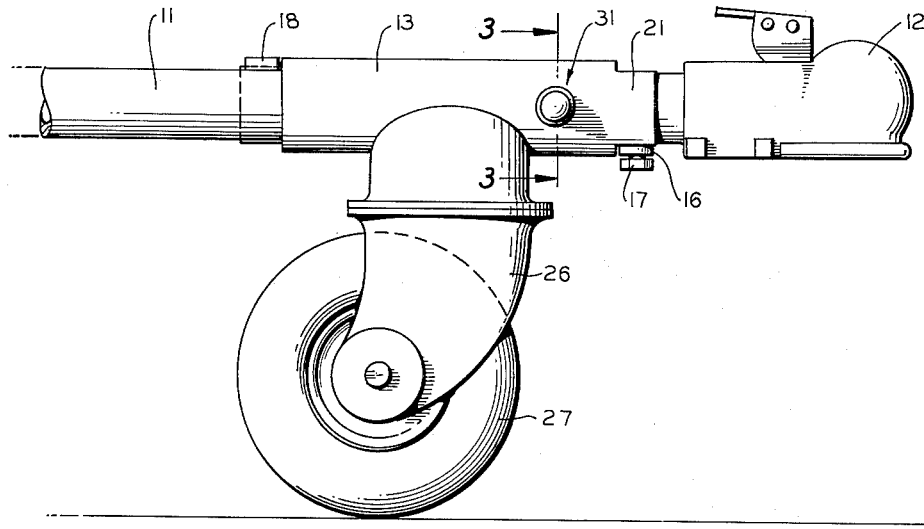
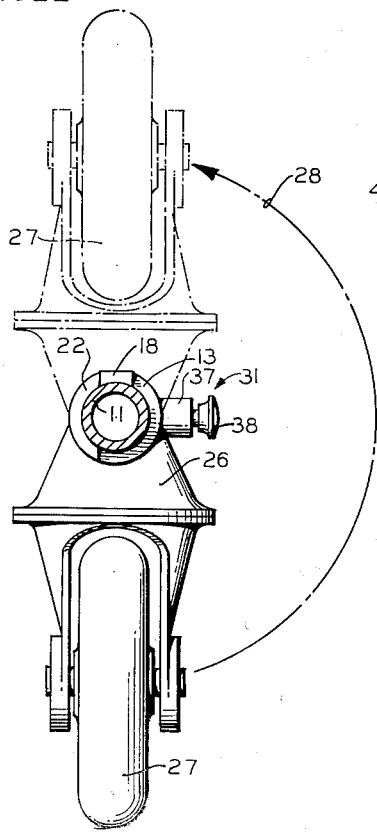
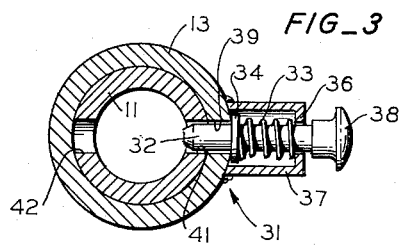
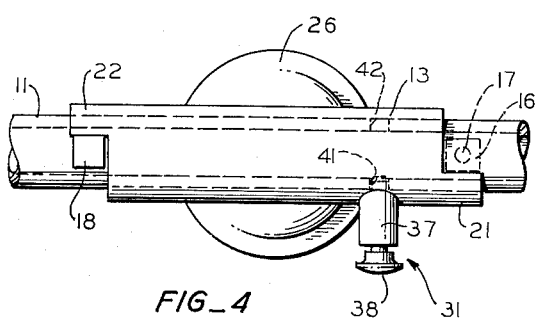
INVENTOR.
CARL A. RUTIGLIANO
BY
*Lothrop & West*
ATTORNEYS April 25, 1961 C. A. RUTIGLIANO 2,981,552
THIRD WHEEL DEVICE
Filed March 4, 1960 2 Sheets-Sheet 2
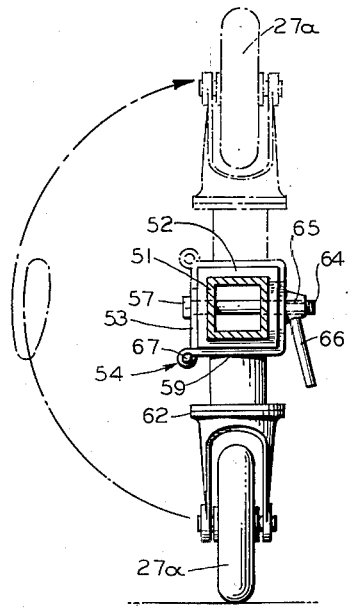
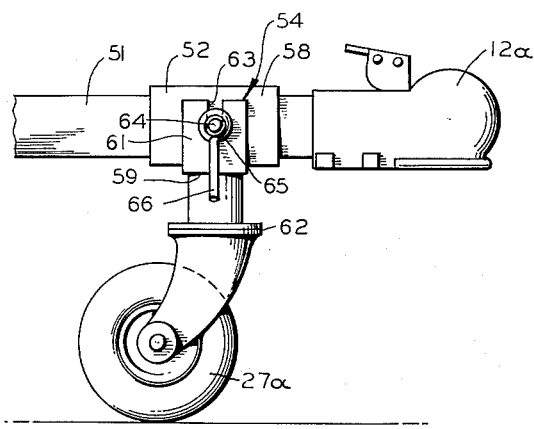
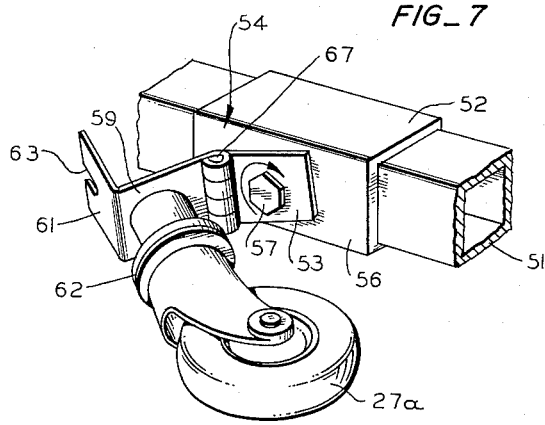
INVENTOR.
CARL A. RUTIGLIANO
BY
*Lothrop & West*
ATTORNEYS

United States Patent Office 2,981,552
Patented Apr. 25, 1961

2,981,552

THIRD WHEEL DEVICE

Carl A. Rutigliano, Rte. 1, Box 330, Vacaville, Calif.

Filed Mar. 4, 1960, Ser. No. 12,819

3 Claims. (Cl. 280—150.5)

The invention relates to trailer wheels and, more particularly, to third wheels for boat trailers.

A third wheel is required to give support and mobility to a boat trailer whenever the trailer is removed from its draft vehicle. On the other hand, when the trailer is being drawn by the vehicle, it is preferable that the third wheel not be in touching engagement with the ground.

It is therefore an object of the invention to provide a third wheel device which firmly supports a boat trailer whenever support is necessary.

It is another object of the invention to provide a third wheel device which gives to the trailer a great degree of mobility and ease of handling.

It is still another object of the invention to provide a third wheel device which is readily swung from a trailer-supporting position to a location which is out of the way.

It is a further object of the invention to provide a third wheel device which is sturdy, yet economical, and has but few moving parts to get out of order.

It is another object of the invention to provide a generally improved third wheel device for a boat trailer.

Other objects, together with the foregoing, are attained in the embodiments described in the following description and shown in the accompanying drawings in which:

Figure 1 is a side elevational view of one form of the device;

Figure 2 is an end view showing in outline the location of the device in its inoperative position;

Figure 3 is a section to an enlarged scale of the latching mechanism, the plane of section being indicated by the lines 3—3 in Figure 1;

Figure 4 is a plan view of the latching mechanism and mounting structure;

Figure 5 is a side elevational view of a modified form of the device;

Figure 6 is an end view showing in outline the location of the device in its inoperative position; and Figure 7 is a perspective device in a position immediate its operative and inoperative locations.

While the third wheel device of the invention is susceptible of numerous physical embodiments, depending on the environment and requirements of use, substantial numbers of the herein shown and described embodiments have been made and used and all have performed in a highly satisfactory manner.

As is shown in more detail in my copending application Serial No. 781,033 filed December 17, 1958 for Extensible Boat Trailer and as is typical of the majority of boat trailers, a draw bar 11 or tube extends forwardly from the customary trailer (not shown) for attachment, through a conventional knuckle device 12, to a draft vehicle (not shown).

Encompassing the cylindrical tube 11 is a sleeve 13. While the sleeve is rotatable, within limits, on the tube, the sleeve's translational movement is restricted by a forward lower limit stop 16 secured to the tube 11, as by a bolt 17, and an after upper limit stop 18 fastened to the tube. As appears most clearly in Figures 1, 2 and 4, certain peripheral portions of the sleeve ends are removed, leaving a forward sleeve sector 21 and an after sleeve sector 22 adapted to interfere with the limit stops 16 and 18, respectively, in the extremes of the two positions of the sleeve as a wheel post 26 mounted on the sleeve, and wheel 27, is swung between the depending position shown in full line in Figure 2 upwardly through the arc 28 to the upstanding attitude indicated in outline in Figure 2, the arc of movement being approximately 180 degrees.

Adapted to lock the wheel post both in lowermost, or depending, position and in uppermost, or upstanding, position, is a latch mechanism, generally designated by the reference numeral 31.

The latch 31 comprises a pin 32 urged inwardly by a spring 33 interposed between a shoulder 34 and a cap 36 of a latchbox or housing 37.

A knob 38 on the outer end of the pin permits easy manual withdrawal of the pin 32 disposed within an opening 39 in the sleeve 13 and projectable into a predetermined one of a pair of opposed apertures 41 and 42 in the tube 11. The aperture 41 is located to receive the pin 32 at the lower limit of rotation of sleeve 13, so as to lock the wheel 27 in downwardly depending position, and the aperture 42 is located approximately 180 degrees from the aperture 41 for receiving the pin 32 at the upper limit of rotation of the sleeve 13, so as to lock the wheel 27 in its upwardly extending position.

A modified form of the device of the invention is shown in Figures 5–7, wherein the draw bar, designated by the reference numeral 51, is rectangular in cross section and is fitted with a rectangular sleeve 52 affixed thereto for enlarging and solidifying the draw bar at the zone where the wheel is attached, near the knuckle device 12a. In this form of the device, a first leaf 53 of a hinge 54 is pivotally mounted on one side 56 of the draw bar (sleeve 52), as by a bolt 57 transpiercing the leaf and draw bar and projecting from the opposite side 58 of the bar (sleeve 52). A second leaf 59 of the hinge 54 is hingeably mounted on the first leaf 53 and has an extension 61 at one end and at right angles thereto. A wheel post 62, carrying a wheel 27a, is mounted on the leaf 59 and projects in a direction opposite to that of the extension 61. The second leaf 59 is adapted to extend across the bar 51 (sleeve 52) and the extension 61 is adapted to overlie a portion of the other side 58 of the bar, and particularly the portion where the threaded end 64 of the bolt 57 protrudes, the extension 61 having a slot 63 or fork formed in the end and registering with the extending end 64 of the bolt 57. Structure, here shown as including the bolt 57 and a nut 65 with attached handle 66, is provided for clamping the extension 61 to the other side 58 of the bar.

In operation, starting from the position shown in Figure 5, the handle nut 65 is loosened and the entire assembly including the extension 61, the leaf 59, the post 62 and the wheel 27a is swung approximately 90 degrees on the hinge pivot pin 67 as shown in Figure 6. The assembly above described and also including the leaf 53 is then pivoted 180 degrees on the bolt 57, as shown by the loop of the dashed line in Figure 6 and through the position shown in Figure 7. The assembly is then pivoted again on hinge pin 67 to approximately 90 degrees to bring the wheel and post into upstanding position (as shown in phantom, Figure 6) and to bring the extension 61 and the slot 63 into re-registration with the end 64 of bolt 57. The nut 65 is then tightened to lock the assembly in this position. Reverse movement of the assembly to the downwardly-depending position of the wheel 27a is similarly accomplished. It will be noted that the leaf 59 extends across the top of the bar when the wheel is upstanding, and across the bottom of the bar when the wheel is downwardly depending.

What is claimed is:

1. A third wheel device for a boat trailer having a forwardly extending draw bar which is rectangular in section, said device comprising a hinge having a first leaf pivotally mounted on one side of said bar, a second leaf hingeably mounted on said first leaf, a second leaf extension mounted on one end of said second leaf at right angles thereto, said second leaf being adapted to extend across said bar and said extension being adapted to overlie a portion of the other side of said bar, means for clamping said extension to said other side of said bar, and a wheel post mounted on said second leaf whereby said wheel post is in a vertically depending position when said second leaf extends across the bottom of said bar and in a vertically upstanding position when said second leaf extends across the top of said bar.

2. A third wheel device for a boat trailer having a forwardly extending draw bar which is rectangular in cross section, said device comprising a hinge having a first leaf pivotally mounted on one side of said bar, a second leaf hingeably mounted on said first leaf, said second leaf being adapted to extend from said one side of said bar to the other side thereof, means for selectively clamping said second leaf in a first position on the upper side and in a second position on the lower side of said bar, and a wheel post mounted on said second leaf whereby said wheel post is disposed in a vertically depending position when said second leaf extends across and is clamped to said lower side of said bar and is in a vertically upstanding position when said second leaf extends across and is clamped to said upper side of said bar.

3. The device of claim 2 wherein said clamping means comprises a bolt extending through said draw bar and said first leaf and having a threaded end projecting outwardly from said other side of said bar, a nut on said end of said bolt and an extension mounted on the end of said second leaf, said extension including an end portion adapted to underlie said nut in clamping relation to said second side both in said first position of said second leaf and in said second position thereof.

References Cited in the file of this patent

UNITED STATES PATENTS

| 2,926,930 | Pease | Mar. 1, 1960 |

FOREIGN PATENTS

| 497,338 | Great Britain | Dec. 15, 1938 |
| 883,838 | Germany | July 20, 1953 |